United States Patent
Fujita

(10) Patent No.: US 7,095,417 B2
(45) Date of Patent: Aug. 22, 2006

(54) LINE DRAWING IMAGE GENERATING DEVICE, STORAGE MEDIUM, AND LINE DRAWING IMAGE GENERATING METHOD

(75) Inventor: Yoshikazu Fujita, Chiyoda-ku (JP)

(73) Assignees: Nintendo Co., Ltd., Kyoto (JP); HAL Laboratory Inc., Tokyo (JP)

( * ) Notice: Subject to any disclaimer, the term of this patent is extended or adjusted under 35 U.S.C. 154(b) by 0 days.

(21) Appl. No.: 10/693,954

(22) Filed: Oct. 28, 2003

(65) Prior Publication Data
US 2004/0217970 A1    Nov. 4, 2004

(30) Foreign Application Priority Data
Apr. 30, 2003    (JP)    ............................. 2003-125544

(51) Int. Cl.
*G09G 5/00*    (2006.01)
(52) U.S. Cl. ................. 345/581; 345/589; 345/582; 345/591; 345/597
(58) Field of Classification Search ............. 345/581, 345/589, 582, 591, 597
See application file for complete search history.

(56) References Cited

U.S. PATENT DOCUMENTS

| | | | | |
|---|---|---|---|---|
| 5,859,891 A | * | 1/1999 | Hibbard | 378/62 |
| 5,974,175 A | * | 10/1999 | Suzuki | 382/199 |
| 6,026,182 A | * | 2/2000 | Lee et al. | 382/173 |
| 6,590,521 B1 | * | 7/2003 | Saka et al. | 342/70 |
| 6,847,333 B1 | * | 1/2005 | Bokhour | 345/1.1 |

FOREIGN PATENT DOCUMENTS

JP    2627744    4/1997

* cited by examiner

Primary Examiner—Kee M. Tung
Assistant Examiner—Mike Rahmjoo
(74) Attorney, Agent, or Firm—Nixon & Vanderhye P.C.

(57) ABSTRACT

In an original image, an area whose brightness is smaller than a predetermined value is detected as an ink line area, and a neighboring area of the ink line area, which surrounds the ink line area, is detected as a neighboring area. Furthermore, with respect to an area other than the ink line area and the neighboring area in the original image, an outline portion of an image is detected as an outline area. A color is applied to the ink line area and the outline area, and a different color is applied to an area other than the above two types of area.

31 Claims, 14 Drawing Sheets

F I G. 7
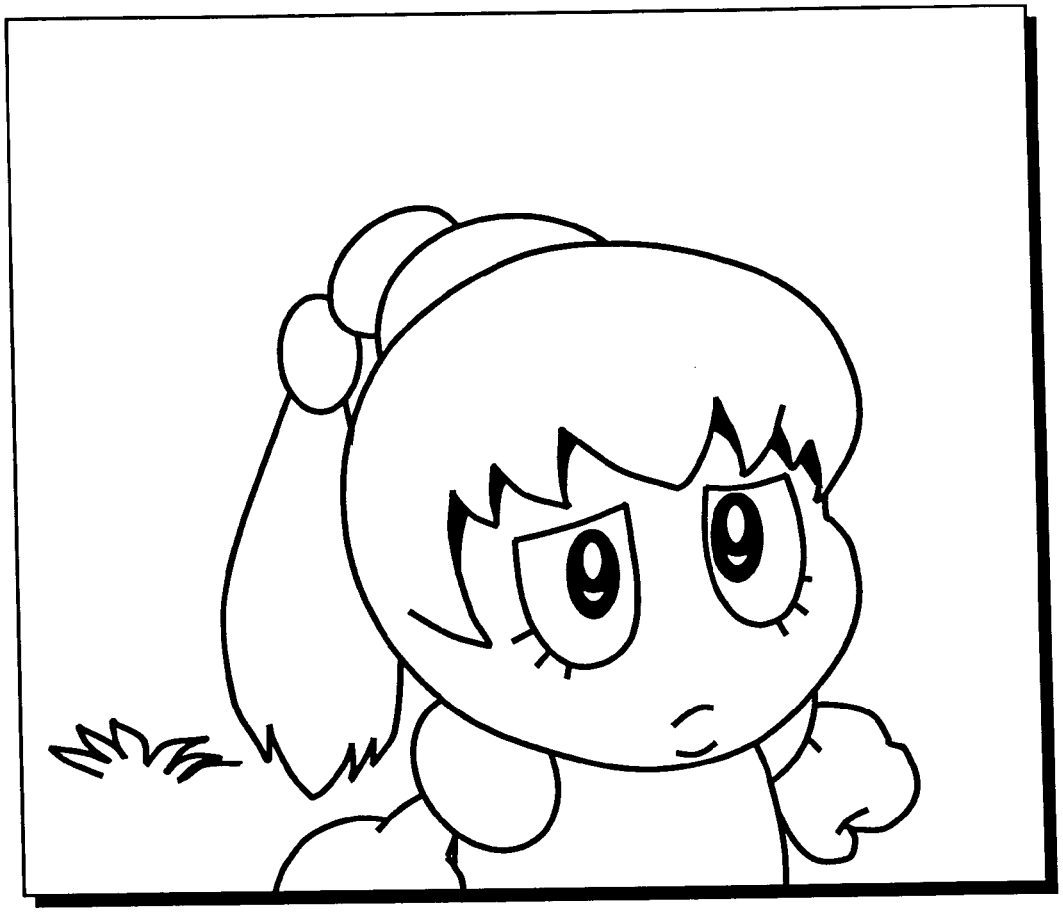

F I G. 9

F I G. 1 1
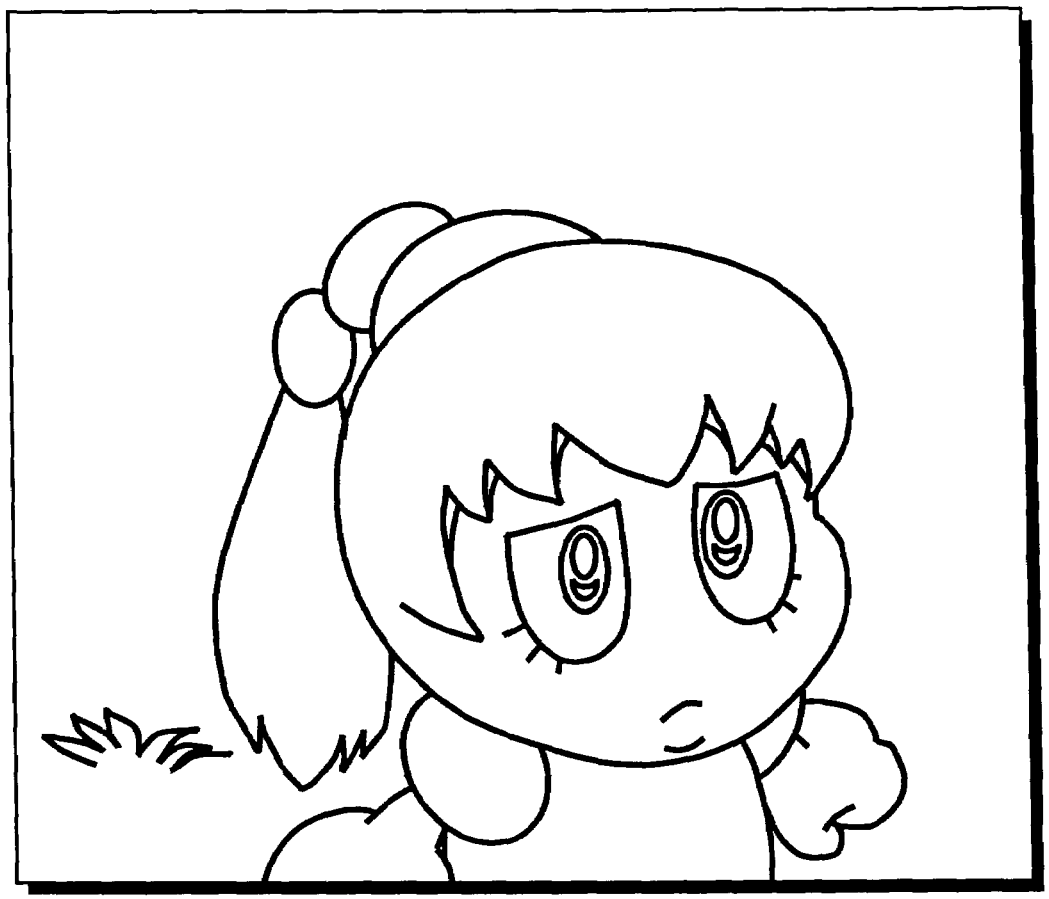

F I G. 1 2

F I G. 1 4   PRIOR ART

LINE DRAWING IMAGE GENERATING DEVICE, STORAGE MEDIUM, AND LINE DRAWING IMAGE GENERATING METHOD

BACKGROUND

1. Technical Field

Present exemplary non-limiting embodiments of the technology described herein relate to a line drawing image generating device, a storage medium, and a line drawing image generating method. More particularly, the present exemplary non-limiting embodiments relates to a line drawing image generating device, a storage medium, and a line drawing image generating method for generating line drawing data based on original image data.

2. Description of Background Art

Conventionally, there is a technique for extracting outlines of an original image by performing a predetermined process for original image data (for example, see Japanese Patent Gazette No. 2627744). In a typical outline extracting process, a brightness or color difference between a pixel to be processed and a pixel in a neighboring area (for example, 3×3 pixels) of the pixel to be processed is estimated, and the pixel to be processed is extracted as an outline if the brightness or color difference exceeds a predetermined value. The neighboring area of the pixel to be processed is extended (for example, 5×5 pixels), thereby thickening a width of an outline to be extracted and improving the continuity of the outline.

By the above outline extracting process, line drawing data is generated from arbitrary image data, and a line drawing is displayed on a TV monitor based on the line drawing data. A user may paint the line drawing using a paint program.

Now, in an image used in animation (referred to as an animation cell), an outline of a character is typically black (this black outline is referred to as an ink line), and patterns of the character's clothes and grasses in a background are not especially outlined in black (see FIG. 13). If a conventional outline extracting process is applied to the above image in which the outlines are partially thickened, outlines in a resultant line drawing vary widely in line width. However, a neighboring area of a pixel to be processed, which is referred to when a brightness or color difference is estimated, is extended in order to improve the continuity of the outline of the grasses in the background of the image shown in FIG. 13, for example, the outline of the character is unnecessarily thickened in a resultant line drawing as shown in FIG. 14. As a result, the image becomes artificial, which is a problem.

SUMMARY

Therefore, an aspect of exemplary non-limiting embodiments of the present technology is to provide a line drawing image generating device, a program, and a method which generate a natural line drawing from an image such as an image used in animation, for example, in which outlines are partially thickened, by performing an outline extracting process.

Notes in parentheses indicate exemplary elements which can be found in the embodiments to follow, though such notes are not intended to limit the scope of the invention.

One exemplary non-limiting embodiment is directed to a line drawing image generating device for generating line drawing data based on original image data (FIG. 13), comprising: ink line area detecting means (a CPU 36 executing step S22); neighboring area detecting means (the CPU 36 executing step S34); outline area detecting means (the CPU 36 executing step S35); line drawing data storing means for storing the line drawing data (84); and color data writing means (the CPU 36 executing steps S31 and S37). The ink line area detecting means detects an area (a pixel for which determination (YES) is made at step S22) whose brightness is smaller than a predetermined value (L) in an original image as an ink line area. The neighboring area detecting means detects a neighboring area (a pixel for which determination (YES) is made at step S34) of the ink line area, which surrounds the ink line area. The outline area detecting means detects an outline portion (a pixel for which determination (YES) is made at step S36) of an image as an outline area, with respect to an area (a pixel for which determination (NO) is made at step S34) other than the ink line area and the neighboring area in the original image. The color data writing means writes color data (black) to a storage area (a pixel for which determination (YES) is made at step S32 and a pixel for which determination (YES) is made at step S36) of the line drawing data storing means, which corresponds to the ink line area and the outline area, and writes different color data (white) to a storage area of the line drawing data storing means, which corresponds to an area other than the ink line area and the outline area.

In the case where the original image contains a plurality of pixels (640×480 pixels), the ink line area is included in a predetermined area (3×3 pixels) surrounding a pixel to be processed in the original image, and if the pixel to be processed is not included in the ink line area, the neighboring area detecting means may detect the pixel to be processed as the neighboring area.

Also, the ink line area detecting means may detect, as the ink line area, a portion of an area where brightness is smaller than a predetermined value (L), such that the portion lies near the outline of the area.

Furthermore, in the case where the original image contains a plurality of pixels (640×480 pixels), and an area other than the ink line area is included in a predetermined area (3×3 pixels) surrounding a pixel to be processed included in an area whose brightness is smaller than a predetermined value (L), the ink line area detecting means may detect the pixel to be processed as the ink line area.

Still further, the line drawing image generating device may further comprise still image data extracting means (the CPU 36 executing step S11) for extracting arbitrary still image data from moving image data, and use the still image data, which is extracted by the still image data extracting means, as the original image data (FIG. 13) for generating the line drawing data.

A storage medium of an exemplary non-limiting embodiment is directed to a computer readable storage medium (18) storing a line drawing image generating program for generating line drawing data based on original image data (FIG. 13). The line drawing image generating program causes a computer (36) to execute: an ink line area detecting step (S22); a neighboring area detecting step (S34); an outline area detecting step (S35); and a color data writing step (S31, S37). The ink line area detecting step detects an area (a pixel for which determination (YES) is made at step S22) whose brightness is smaller than a predetermined value (L) in an original image as an ink line area. The neighboring area detecting step detects a neighboring area (a pixel for which determination (YES) is made at step S34) of the ink line area, which surrounds the ink line area. The outline area detecting step detects an outline portion (a pixel for which determination (YES) is made at step S36) of an image as an outline area with respect to an area (a pixel for which determination (NO) is made at step S34) other than the ink line area and the neighboring area in the original image. The color data writing step writes color data (black) to a storage area (a pixel for which determination (YES) is made at step S32 and a pixel for which determination (YES) is made at step S36) of line drawing data storing means (84) for storing the line drawing data, which corresponds to the ink line area and the outline area, and writes different color data (white) to a storage area of the line drawing data storing means (84), which corresponds to an area other than the ink line area and the outline area.

A line drawing image generating method of a present exemplary non-limiting embodiment generates line drawing data based on original image data (FIG. 13), comprising: an ink line area detecting step (S22); a neighboring area detecting step (S34); an outline area detecting step (S35); and a color data writing step (S31, S37). The ink line area detecting step detects an area (a pixel for which determination (YES) is made at step S22) whose brightness is smaller than a predetermined value (L) in an original image as an ink line area. The neighboring area detecting step detects a neighboring area (a pixel for which determination (YES) is made at step S34) of the ink line area, which surrounds the ink line area. The outline area detecting step detects an outline portion (a pixel for which determination (YES) is made at step S36) of an image as an outline area with respect to an area (a pixel for which determination (NO) is made at step S34) other than the ink line area and the neighboring area in the original image. The color data writing step writes color data (black) to a storage area (a pixel for which determination (YES) is made at step S32 and a pixel for which determination (YES) is made at step S36) of line drawing data storing means (84) for storing the line drawing data, which corresponds to the ink line area and the outline area, and writes different color data (white) to a storage area of the line drawing data storing means (84), which corresponds to an area other than the ink line area and the outline area.

As such, exemplary non-limiting embodiments enables a natural line drawing to be generated from an image such as an image used in animation, for example, in which outlines are partially thickened, by performing an outline extracting process.

These and other features, aspects and advantages of the exemplary non-limiting embodiments will become more apparent from the following detailed description of the exemplary non-limiting embodiments when taken in conjunction with the accompanying drawings.

BRIEF DESCRIPTION OF THE DRAWINGS

FIG. 7 is an illustration showing exemplary image data to be finally stored in an ink line storing buffer;

FIG. 9 is an illustration showing exemplary line drawing data to be finally stored in a line drawing storing buffer;

FIG. 11 is an illustration showing exemplary image data to be finally stored in an additional buffer;

FIG. 12 is an illustration showing exemplary line drawing data to be finally stored in the line drawing storing buffer in the variant of the embodiment;

FIG. 14 is an illustration showing a line drawing generated by a conventional outline extracting process.

DESCRIPTION OF THE PREFERRED EMBODIMENTS

Hereinafter, a game system according to an exemplary non-limiting embodiment will be described.

Figure 1:
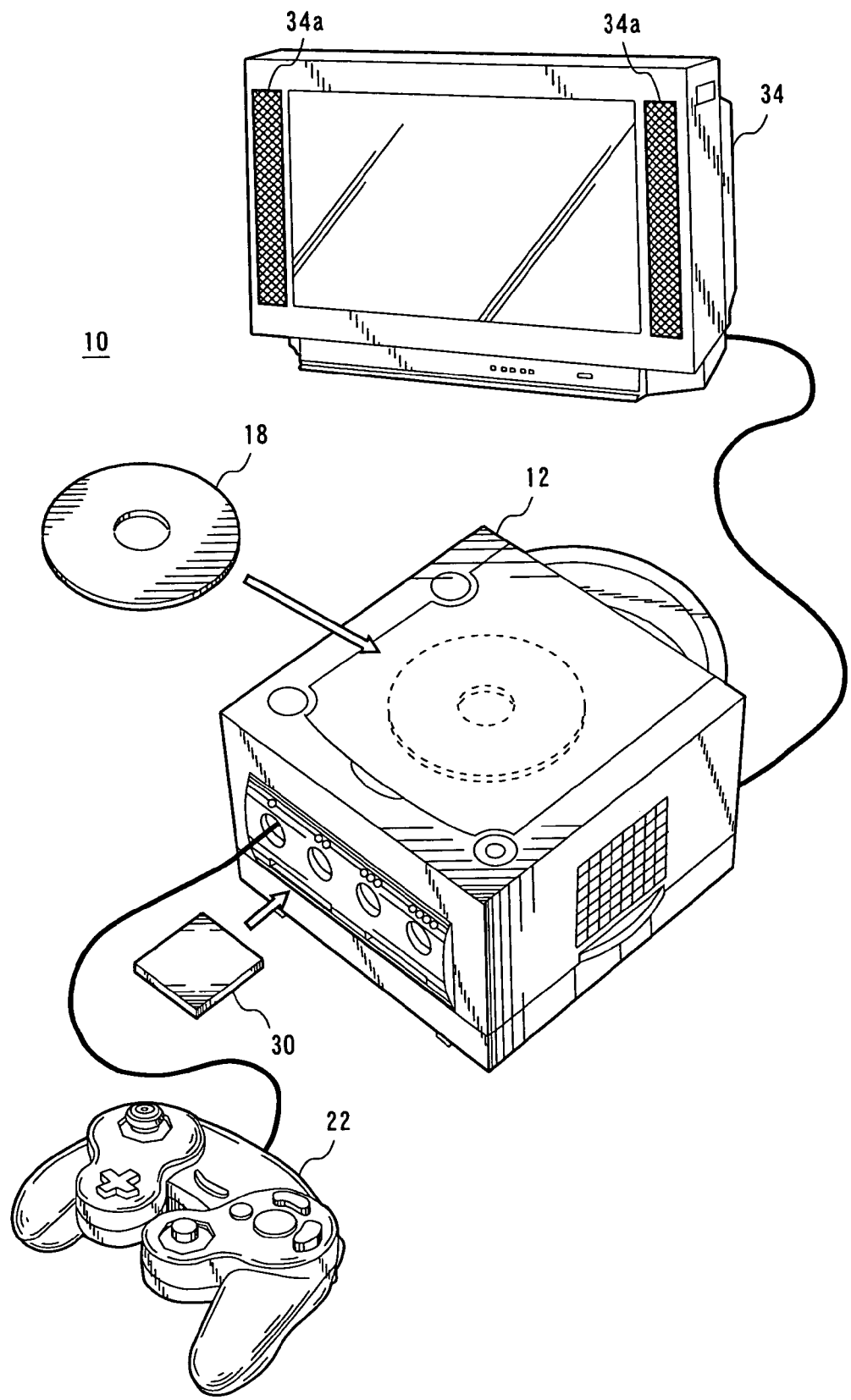
FIG. 1 is an external view of a game system according to an exemplary non-limiting embodiment.
Figure 2:
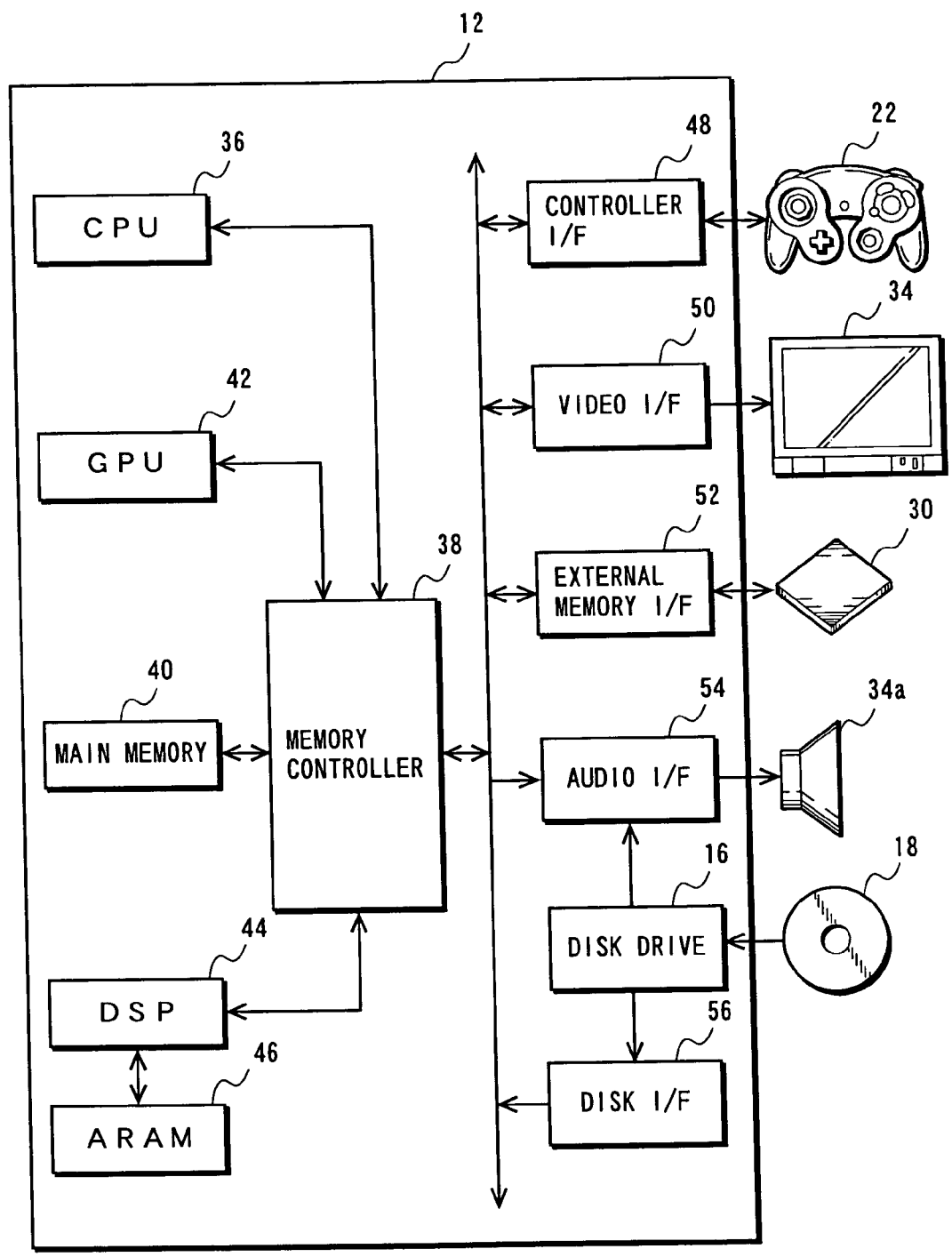
FIG. 2 is a block diagram showing the structure of a main unit.

FIG. 1 is an external view of a game system according to the exemplary non-limiting embodiment, and FIG. 2 is a block diagram of the above game system. As shown in FIGS. 1 and 2, a game system 10 includes a main body 12, a DVD-ROM 18, an external memory card 30, a controller 22, a loudspeaker 34a, and a TV monitor 34. The DVD-ROM 18 and the external memory card 30 are removably mounted on and inserted into the main body 12, respectively. The controller 22 is connected to any one of a plurality of controller port connectors (in FIG. 1, four controller port connectors) of the main body 12, via a communication cable. The TV monitor 34 and the loudspeaker 34a are connected to the main body 12 by an AV cable, etc. Note that the main body 12 may perform radio communications with the controller 22. Hereinafter, each component of the game system 10 will be described in details.

The DVD-ROM 18, which fixedly stores a game program and moving image data, etc., is mounted on the main body 12 when a player plays a game. Note that an arbitrary computer readable storage medium such as a CD-ROM, a MO, a memory card, and a ROM cartridge, etc., may be used in place of the DVD-ROM 18 in order to store the game program, etc.

The external memory card 30 is a rewritable storage medium such as a flash memory, for example, and stores data such as saving data in the game.

The main body 12 reads the game program and the moving image data stored in the DVD-ROM 18, and performs a game process.

The controller 22 is an input device by which the player performs an input about a game operation, and includes a plurality of operation switches. The controller 22 outputs operation data to the main body 12 when the player presses the operation switches, for example.

The TV monitor 34 displays the image data output from the main body 12 on a screen. Note that the loudspeaker 34a, which is typically built in the TV monitor 34, outputs a sound of the game output from the main body 12.

Next, the structure of the main body 12 will be described. In FIG. 2, the main body 12 includes a CPU 36 and a memory controller 38, which is connected to the CPU 36. Furthermore, in the main body 12, the memory controller 38 is connected to a graphics processing unit (GPU) 42, a main memory 40, a DSP 44, and various interfaces (I/F) 48 to 56. The memory controller 38 controls data transfer between the above components.

When the game is started, a disk drive 16 drives the DVD-ROM 18 mounted on the main body 12. The game program stored in the DVD-ROM 18 is read by the main memory 40 via the disk I/F 56 and the memory controller 38.

The CPU 36 executes the program in the main memory 40, and starts the game. After the game is started, the player uses the operation switches for inputting game operations, etc., to the controller 22. In accordance with the input from the player, the controller 22 outputs operation data to the main body 12. The operation data output from the controller 22 is input to the CPU 36 via the controller I/F 48 and the memory controller 38. The CPU 36 performs a game process in accordance with the input operation data. The GPU 42 and the DSP 44 are used for generating image data, etc., in the game process. An ARAM (Audio-grade DRAM) 46 is used when the DSP 44 performs a predetermined process.

The GPU 42 generates image data to be displayed on the TV monitor 34, and outputs the image data to the TV monitor 34 via the memory controller 38 and the video I/F 50. Note that sound data generated by the CPU 36 when the game program is executed is output from the memory controller 38 to the loudspeaker 34*a* via the audio I/F 54.

Figure 3:
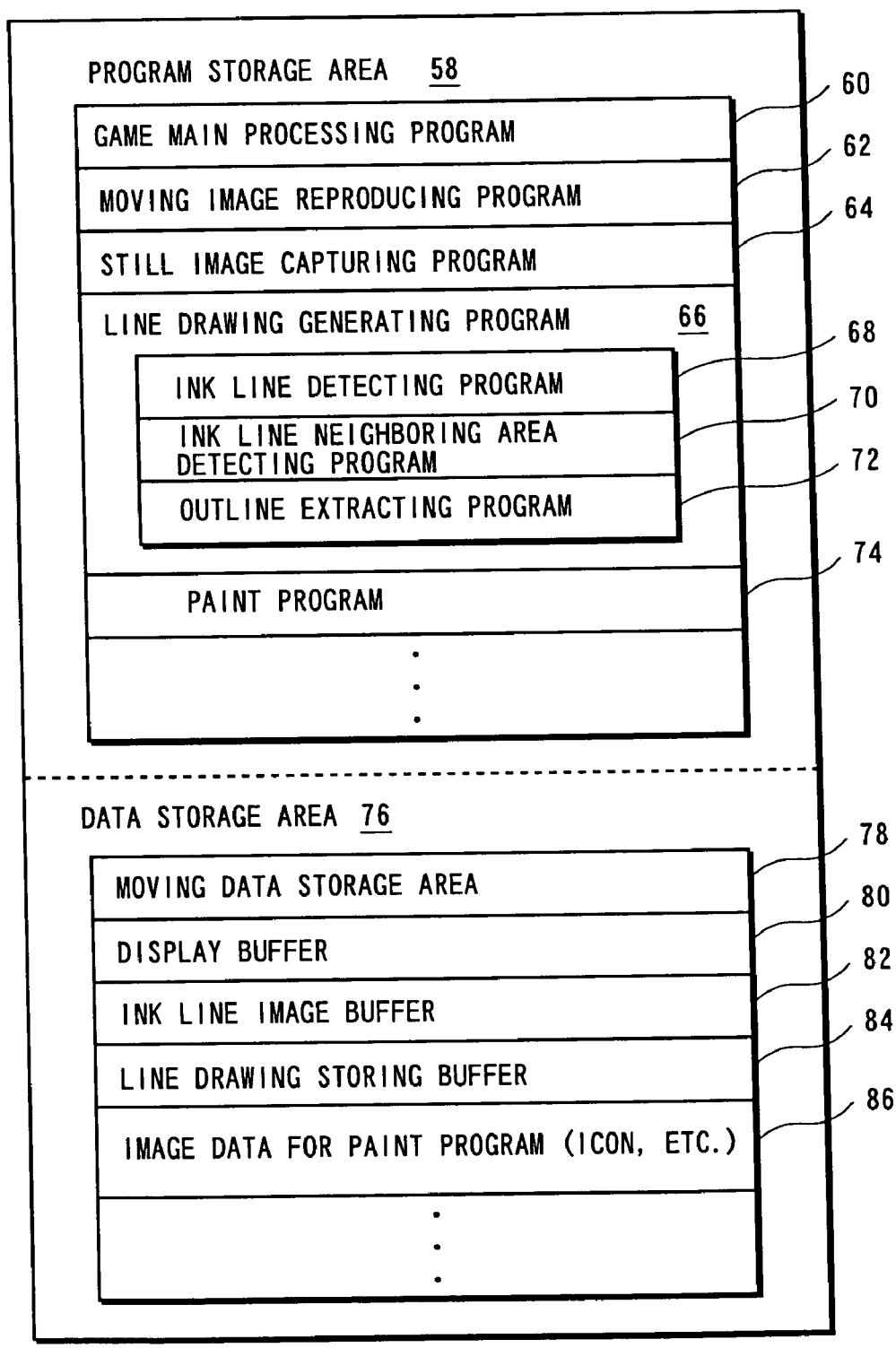
FIG. 3 is an illustration showing a memory map of a main memory.

In FIG. 3, an illustration showing a memory map of the main memory 40 is shown. The main memory 40 includes a program storage area 58 for storing a program, and a data storage area 76 for storing data.

The program storage area 58 stores a game main processing program 60, a moving image reproducing program 62, a still image capturing program 64, a line drawing generating program 66, and a paint program 74, etc. These programs are read by the DVD-ROM 18, if necessary, and stored in the main memory 40. The line drawing generating program 66 includes an ink line detecting program 68, an ink line neighboring area detecting program 70, and an outline extracting program 72.

The data storage area 76 includes a moving image data storage area 78, a display buffer 80, an ink line image buffer 82, and a line drawing storing buffer 84, and further stores a paint program image data 86, etc. The moving image data storage area 78 temporarily stores the moving image data read from a DVD-ROM. The paint program image data 86 is read from the DVD-ROM 18, if necessary, and stored in the main memory 40.

Hereinafter, an operation of the game system 10 will be described.

In the present embodiment, the player selects a moving image when the game is started, and a reproducing process is performed for the selected moving image. The player is allowed to extract a currently displayed image as a still image by operating the controller 22 at any given time during reproduction of the moving images. The still image is extracted, and a line drawing is generated from the extracted still image. Then, the player enjoys freely painting the generated line drawing on the TV monitor 34.

With reference to flowcharts shown in FIGS. 4 to 6, a process performed by the CPU 36 of the present embodiment will be described.

Figure 4:
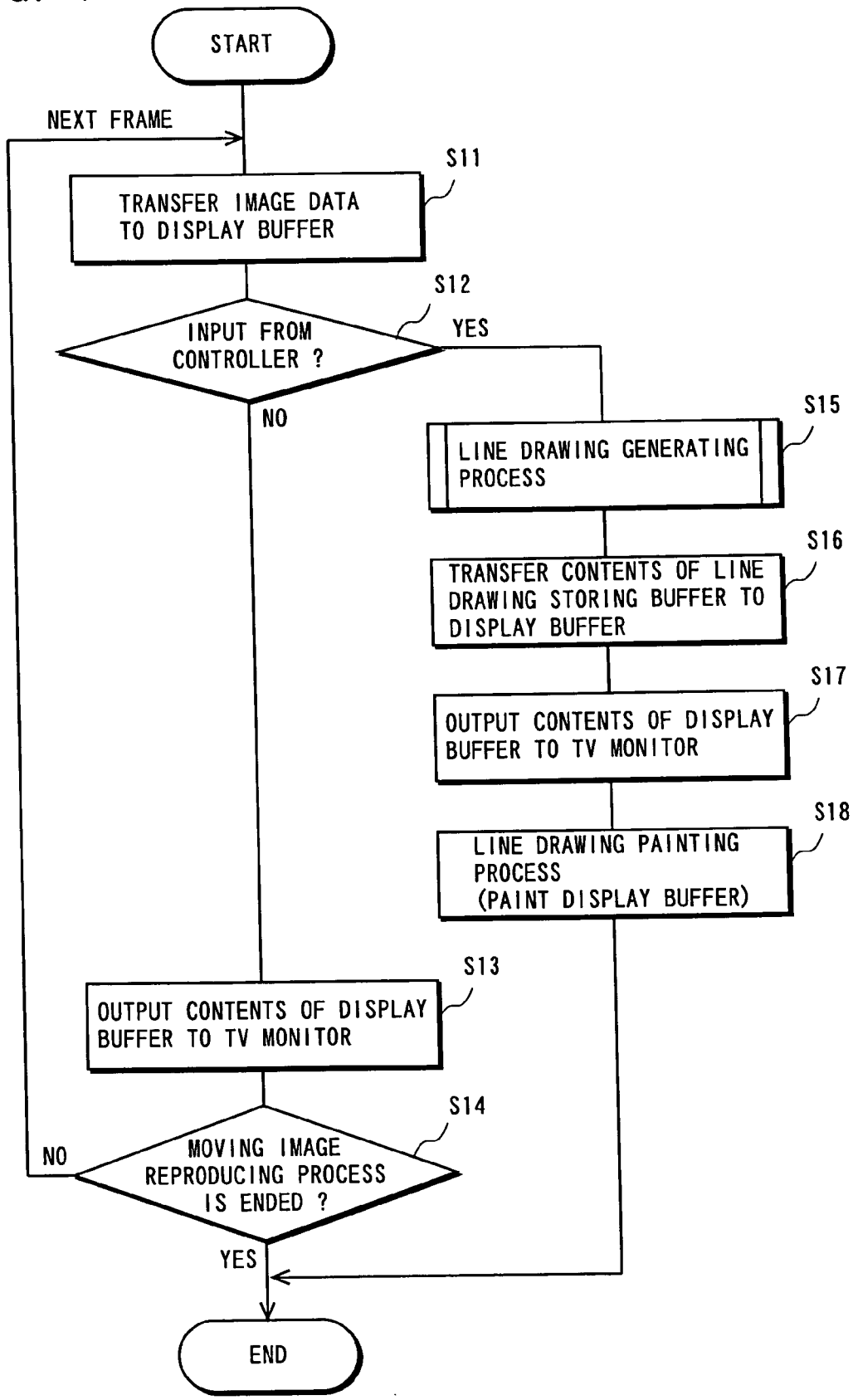
FIG. 4 is a flowchart showing an operation of a CPU 36.

In FIG. 4, when the game process is started, the CPU 36 performs a moving image reproducing process based on the moving image reproducing program 62. Specifically, the CPU 36 transfers image data of a predetermined frame, which is included in the moving image data stored in the DVD-ROM 18 (or temporarily stored in the moving image data storage area 78 after being read from the DVD-ROM 18) to the display buffer 80 (S11), and outputs a video signal based on the image data, which is transferred to the display buffer 80, to the TV monitor 34 (S13). Then, the CPU 36 determines whether or not the moving image reproducing process is ended (S14), and performs the same process for image data of a next frame if the moving image reproducing process is not ended. By repeating the process performed at step S11 and step S13, moving images are reproduced on the screen of the TV monitor 34. If the determination is made at step S13 that the moving image reproducing process is ended, the game process is ended.

Note that, during the moving image reproducing process, the CPU 36 monitors the input from the controller 22, based on the still image capturing program 64 (S12), and stops the moving image reproducing process if there is an input from the controller 22. Then, the CPU 36 uses the still image data currently stored in the display buffer 80 as original image data, and starts a line drawing generating process based on the line drawing generating program 66 (S15). The details of the line drawing generating process will be described below.

As a result of the line drawing generating process, line drawing data is stored in the line drawing storing buffer 84. The CPU 36 transfers the line drawing data to the display buffer 80 (S16), and outputs a video signal based on the line drawing data, which is transferred to the display buffer 80, to the TV monitor 34 (S17). The CPU 36 executes a line drawing painting process by the paint program utilizing the line drawing data (S18), and ends the game.

Next, with reference to FIGS. 5 and 6, the details of the line drawing generating process at step S15 will be described.

Figure 5:
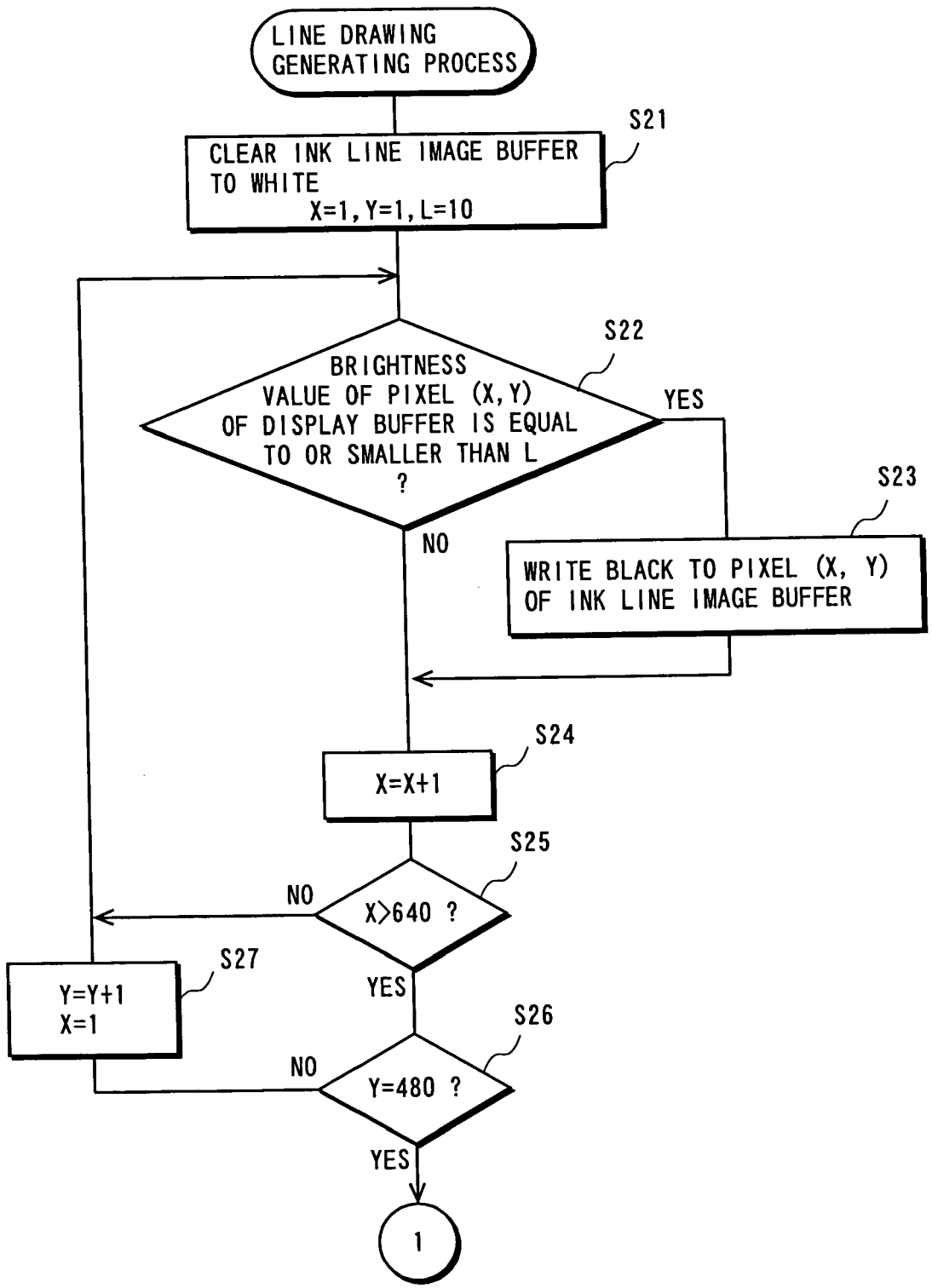
FIG. 5 is a portion of a flowchart showing a line drawing generating process.

In FIG. 5, when the line drawing generating process is started, a process for detecting an ink line area (an area with a low brightness, such as an ink line of an animation cell) in an original image is performed first based on the ink line detecting program 68. Specifically, the CPU 36 clears the ink line image buffer 82 (writes white to all pixels), and sets 1 to X and Y (coordinates for specifying a pixel to be processed), respectively, as an initial value, and sets 10 as a threshold value of a brightness used for determination of an ink line area (S21). Note that, in this embodiment, it is assumed that a brightness of each pixel of image data is defined within a range from 0 to 255. The threshold value L, which is not limited to 10, is set to an optimum value.

The CPU 36 determines whether or not a brightness of the pixel (X, Y) to be processed in the original image is equal to or smaller than L, based on the original image data stored in the display buffer 80 (S22). If the determination is made that the brightness is equal to or smaller than L, the CPU 36 writes black to a storage area corresponding to a pixel (X, Y) of the ink line image buffer 82 (S23), and proceeds to step S24. On the other hand, if the brightness is greater than L, the CPU 36 directly proceeds to step S24.

The CPU 36 increments X at step S24, and determines at step S25 whether or not X is smaller than 640. Note that, in this embodiment, it is assumed that the size of image data to be processed is 640×480 pixels. If the determination is made that X is equal to or smaller than 640, the CPU 36 goes back to step S22. If the determination is made that X is greater than 640, the CPU 36 proceeds to step S26. At step S26, the CPU 36 determines whether or not Y is 480. If the determination is made that Y is not 480, the CPU 36 increments Y at step S27, sets 1 to X, and goes back to step S22. On the other hand, if Y is 480, the CPU 36 proceeds to step S31 of FIG. 6. By the process performed at steps S24 to S27, the pixel to be processed is sequentially shifted, which is just like scanning a scanning line, and all pixels are finally processed.

As a result of the above process from steps S21 to S27, in the ink line image buffer 82, black is written to the pixels corresponding to the ink line area (area with a low brightness) of the original image, and white is written to the remaining pixels, as shown in FIG. 7.

Figure 6:
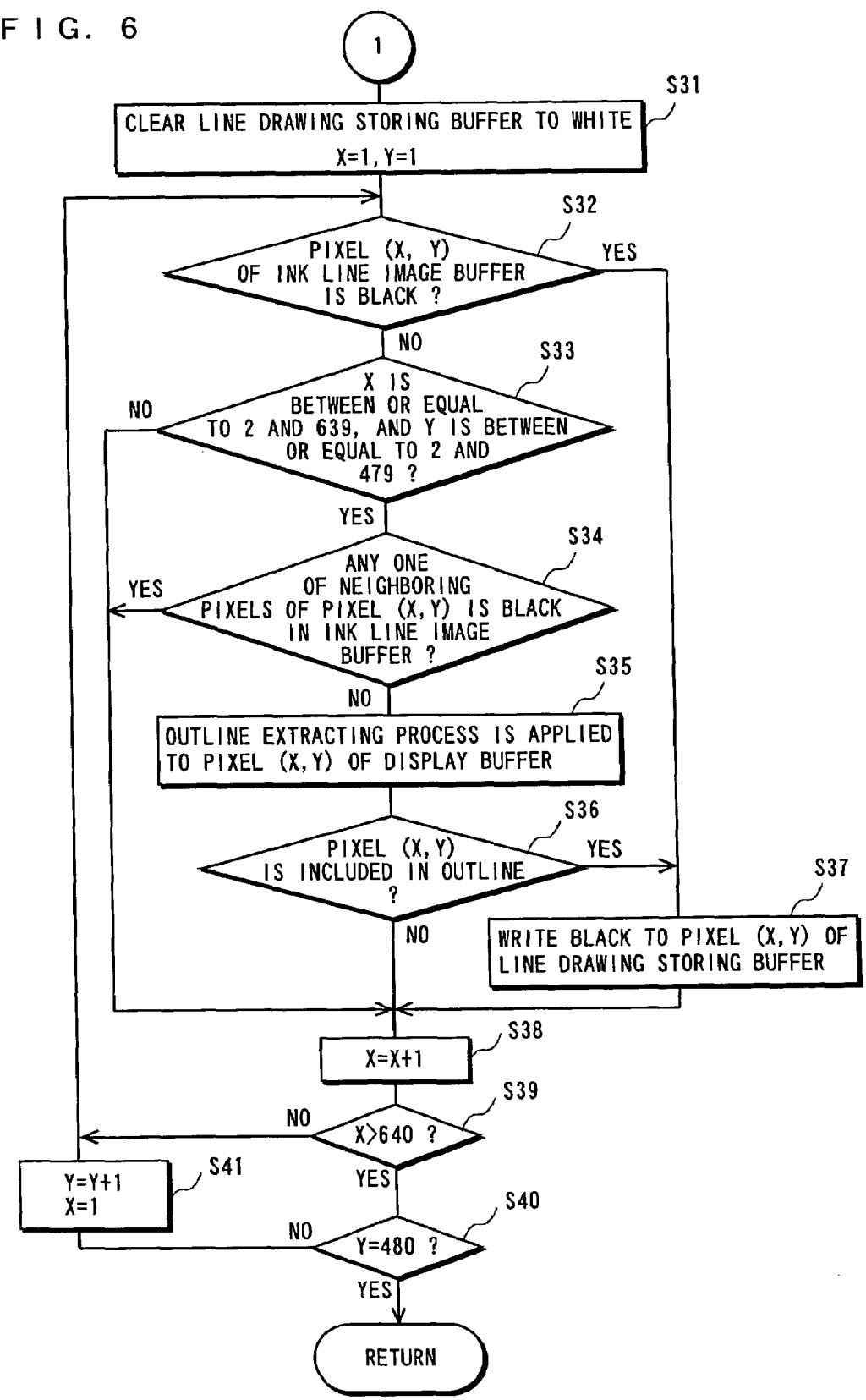
FIG. 6 is a portion of a flowchart showing a line drawing generating process.

In FIG. 6, the CPU 36 first clears the line drawing storing buffer 84 (writes white to all pixels), and sets 1 to X and Y (coordinates for specifying a pixel to be processed), respectively, as an initial value (S31). Then, the CPU 36 determines whether or not the pixel (X, Y) to be processed is black in the ink line image buffer 82 (that is, whether or not the pixel to be processed is included in the ink line area) (S32). If the determination is made that the pixel to be processed is black, the CPU 36 writes black to a pixel (X, Y) of the line drawing storing buffer 84 at step S37, and proceeds to step S38. On the other hand, if the pixel to be processed is not black, the CPU 36 proceeds to step S33.

The CPU 36 determines at step S33 whether or not X is between or equal to 2 and 639, and Y is between or equal to 2 and 479. If the determination is made that X is between or equal to 2 and 639, and Y is between or equal to 2 and 479, the CPU 36 proceeds to step S34. On the other hand, if the determination is made that X is not between or equal to 2 and 639, and Y is not between or equal to 2 and 479, the CPU 36 proceeds to step S38. As a result, if the pixel to be processed is included in the pixels on the edge (upper or bottom edge, right or left edge) of the image data, a process to be performed in the following steps S34 to S36 is omitted.

As step S34, the CPU 36 determines whether or not any of neighboring pixels of the pixel (X, Y) to be processed is black in the ink line image buffer 82 (that is, whether or not the pixel to be processed is in a vicinity of the ink line area), based on the ink line neighboring area detecting program 70. Note that the neighboring pixels of the pixel (X, Y) to be processed are included in a predetermined area (in this embodiment, 3×3 pixels) surrounding the pixel to be processed. More specifically, the neighboring pixels of the pixel (X, Y) to be processed are the following eight pixels:(X−1, Y−1), (X, Y−1), (X+1, Y−1), (X−1, Y), (X+1, Y), (X−1, Y+1), (X, Y+1), (X+1, Y+1). If the determination is made that any of neighboring pixels of the pixel (X, Y) to be processed is black, the CPU 36 proceeds to step S38. On the other hand, if no neighboring pixels of the pixel (X, Y) to be processed are black, the CPU 36 proceeds to step S35. That is, an outline extracting process of step S35, which will be described below, is applied only to a pixel (X, Y) which is not included in the ink line area and its neighboring area.

At step S35, the CPU 36 performs the outline extracting process for the pixel (X, Y) to be processed, which is a pixel of the display buffer 80, based on the outline extracting program 72. As the above outline extracting process, it is possible to use an arbitrary well-known outline extracting algorithm. In this embodiment, an outline extracting process using a Sobel operator, which is a type of differential operator, is performed as an example.

Figure 8:
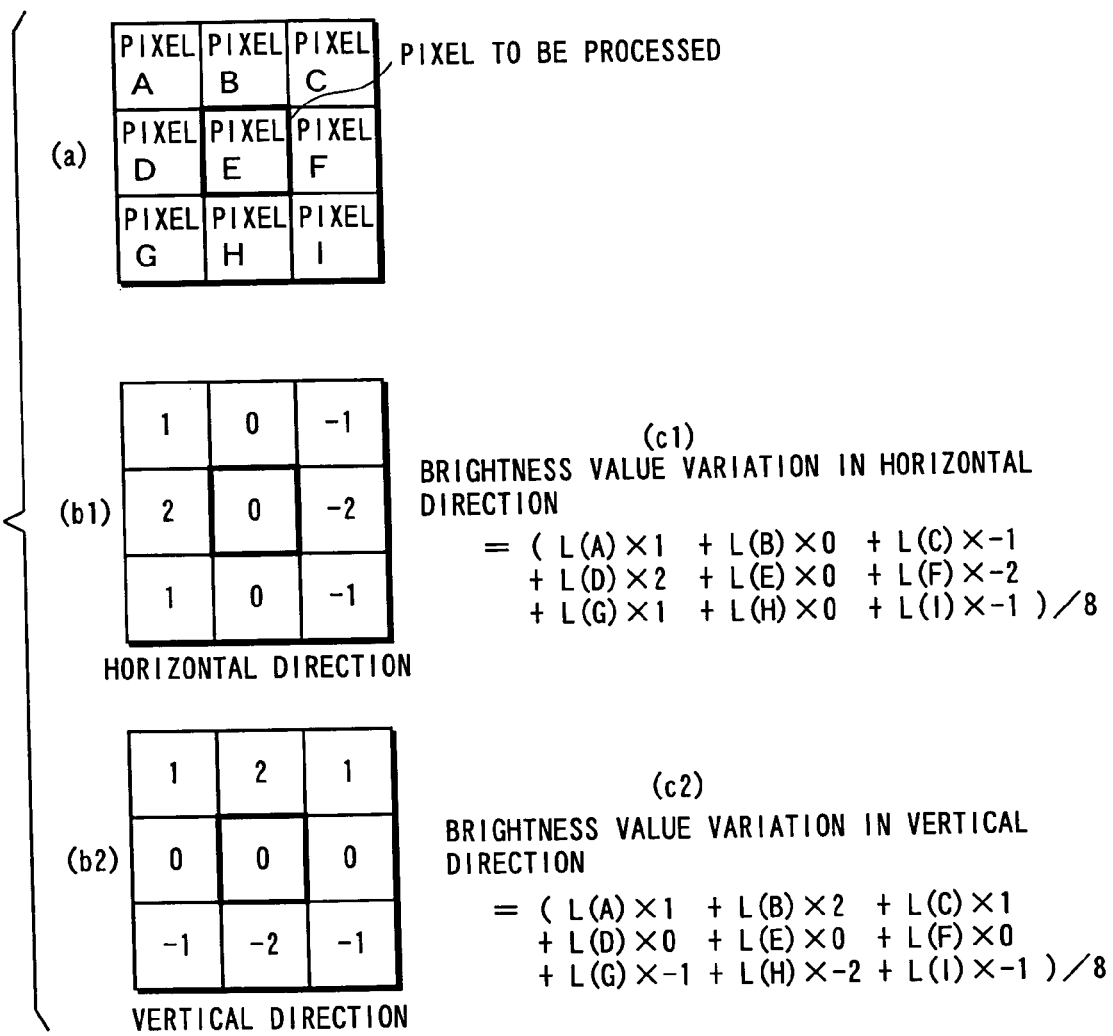
FIG. 8 is an illustration for describing an outline extracting algorithm.

As shown in FIG. 8 (a), the pixels in a predetermined area (3×3 pixels) surrounding the pixel to be processed are referred to as pixels A to I, respectively. Brightness values of the pixels A to I are referred to as L (A) to L (I), respectively. In the outline extracting process using the Sobel operator, these brightness values of the nine pixels are weighted by differential operators as shown in FIG. 8(b1) and FIG. 8(b2), and the weighted sum is obtained. Thus, a brightness value variation in a horizontal direction and a brightness value variation in a vertical direction are obtained as shown in FIGS. 8(c1) and 8(c2), respectively. A brightness variation vector is determined based on the above brightness value variations. That is, a horizontal component of the brightness variation vector corresponds to the brightness value variation in a horizontal direction, and a vertical component of the brightness variation vector corresponds to the brightness value variation in a vertical direction. An outline is a portion in which a brightness value fluctuates widely, whereby it is possible to extract the outline by extracting a portion whose magnitude of a brightness variation vector is greater than a predetermined threshold value. Note that it is possible to differently change the results of the outline extracting process, for example, by extending the range of applicability of the differential operator, or adjusting a threshold value used for estimating a magnitude of a brightness variation vector. For example, it is possible to improve the continuity of an outline to be extracted by reducing the threshold value used for estimating a magnitude of a brightness variation vector. However, if the threshold value used for estimating a magnitude of a brightness variation vector is reduced in a conventional outline extracting process, ink line portions are unnecessarily thickened as shown in FIG. 14.

At step S36, the CPU 36 determines whether or not the pixel (X, Y) to be processed is included in the outline portion, based on the processing results at step S35. If the determination is made that the pixel (X, Y) to be processed is included in the outline portion, the CPU 36 writes black to a pixel (X, Y) of the line drawing storing buffer 84 at step S37, and proceeds to step S38. On the other hand, if the pixel (X, Y) to be processed is not included in the outline portion, the CPU 36 directly proceeds to step S38.

The process performed at steps S38 to S41 is similar to the process performed at steps S24 to S27 shown in FIG. 5. The above process is performed for sequentially shifting the pixel to be processed. After the process performed at steps S38 to S41, all pixels are processed, and the line drawing generating process is ended.

As a result of the above line drawing generating process, in the line drawing storing buffer 84, black is written to the pixels corresponding to the ink line area of the original image, and the pixels corresponding to the outline portion in an area other than the above ink line area and its neighboring area, and white is written to the remaining pixels as shown in FIG. 9. The line drawing data stored in the line drawing storing buffer 84 is used for a line drawing to which the player applies his/her desired colors. As such, according to the present embodiment, the outline extracting process is not performed for the pixels in the vicinity of the ink line area, thereby preventing the ink line portion in the line drawing from being thickened compared to the original image. Thus, in the case where the results of the outline extracting process at step S35 are changed in order to improve the continuity of the outlines of the grasses in the background and the outlines of the patterns of the character's clothes, the ink line portion is not thickened accordingly. As a result, as shown in FIG. 9, it is possible to obtain a natural line drawing whose outline continues smoothly.

Note that, the line drawing shown in FIG. 9 includes black areas other than the outline, for example, the character's pupils and shadows on the forehead, and the player may desire to freely paint these areas. Thus, hereinafter, a method for generating a line drawing which enables the player to freely paint these areas will be described.

Figure 10:
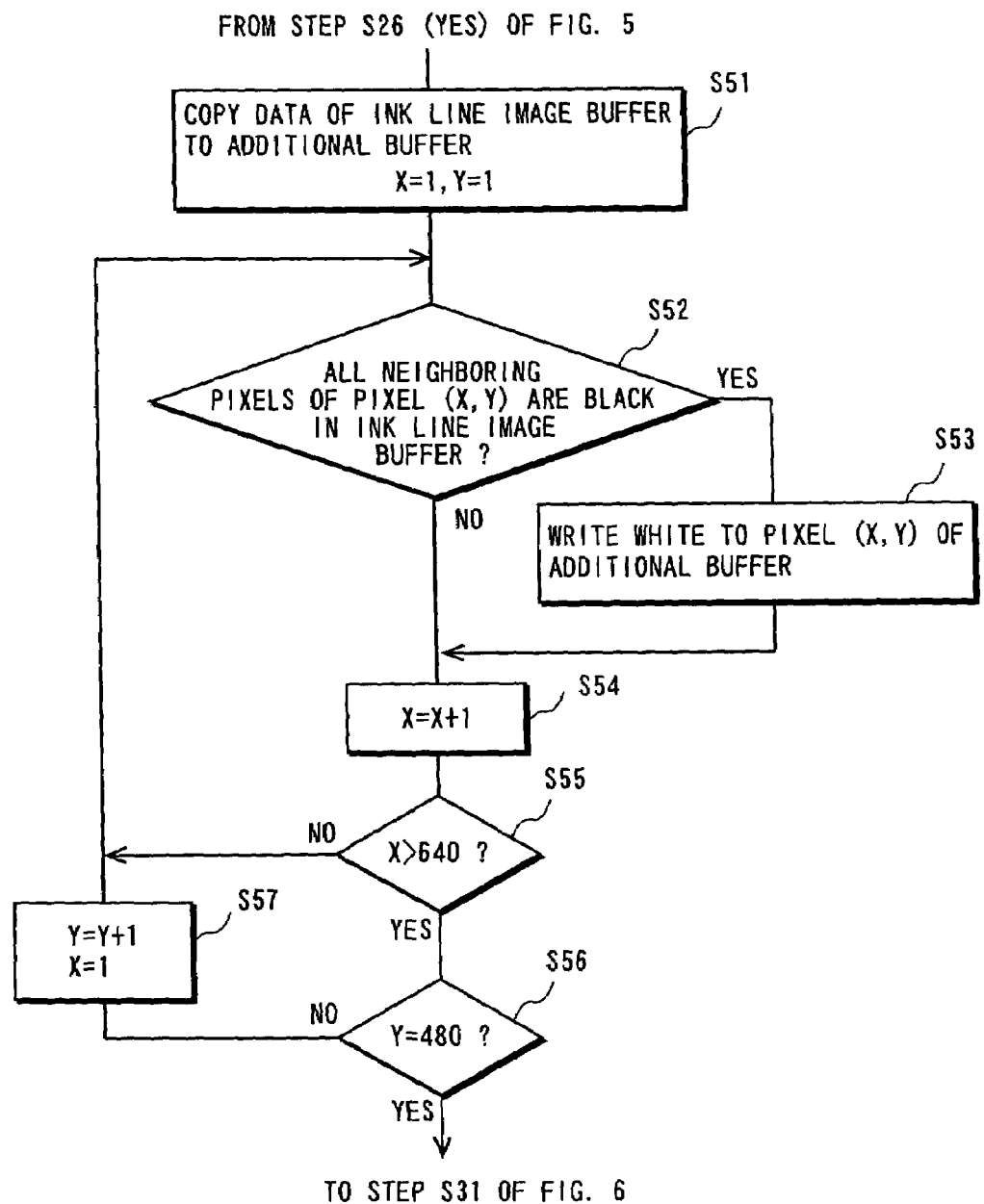
FIG. 10 is a flowchart showing a process of a variant the exemplary non-limiting embodiment.
Figure 13:
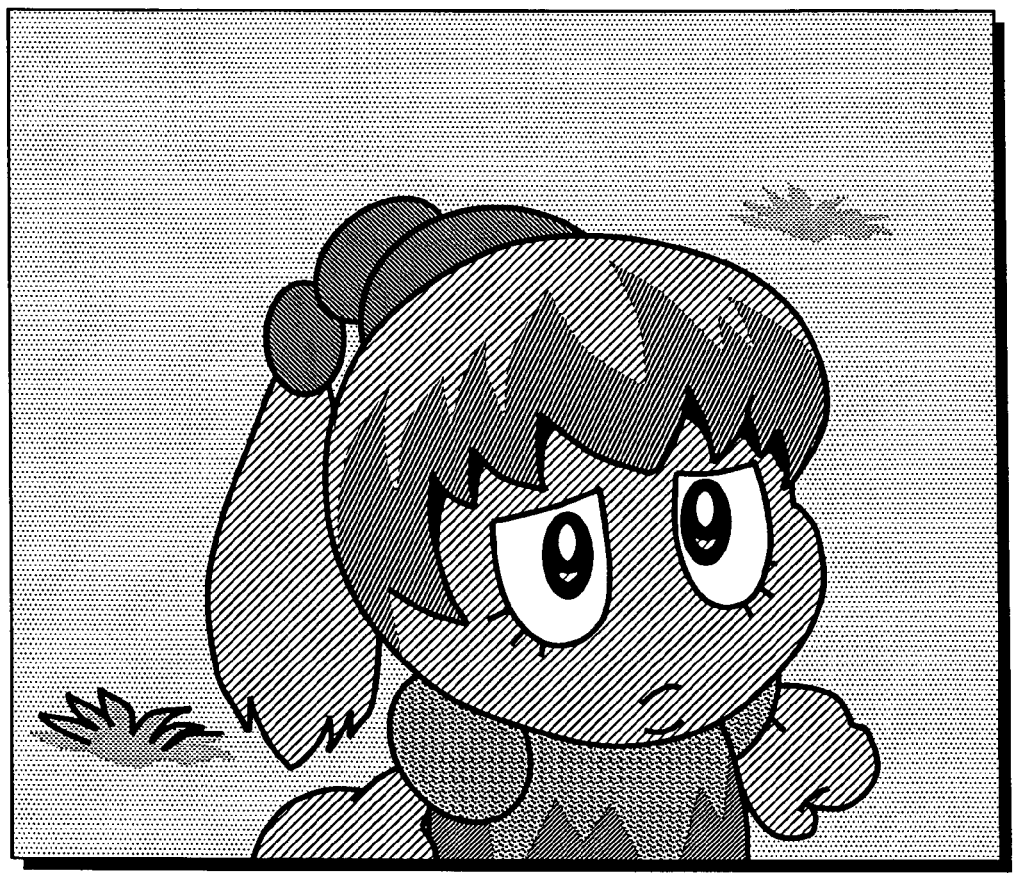
FIG. 13 is an illustration showing an exemplary original image.

In this case, a new buffer (hereinafter, referred to as an additional buffer) is added to the data storage area 76 of the main memory 40, and a process shown in FIG. 10 is added between step S26 shown in FIG. 5 and step S31 shown in FIG. 6. That is, the CPU 36 first copies the data of the ink line image buffer 82 to the additional buffer, and sets 1 to X and Y (coordinates for specifying a pixel to be processed), respectively, as an initial value (S51). Then, the CPU 36 determines whether or not all pixels in a neighboring area (in this case, an area of 5×5 pixels surrounding the pixel (X, Y) to be processed) are black in the ink line image buffer 82

(S52). If the determination is made that all pixels in the neighboring area are black, the CPU 36 writes white to a pixel (X, Y) of the additional buffer at step S53, and proceeds to step S54. On the other hand, if all pixels in the neighboring area are not black, the CPU 36 directly proceeds to step S54. As a result, white is written to a pixel in the ink line area, such that the pixel lies away from the outline.

The process from steps S54 to S57 is similar to the process from steps S24 to S27 of FIG. 5. The above process is performed for sequentially shifting the pixel to be processed. When all pixels are processed, the CPU 36 proceeds to step S31 of FIG. 6. In the additional buffer, image data shown in FIG. 11 is stored. In the process after step S31, the additional buffer is referred to in place of the ink line image buffer 82. As a result of the above line drawing generating process, line drawing data shown in FIG. 12 is stored in the line drawing storing buffer 84. The player can enjoy freely painting the character's pupils and shadows on the forehead, for example, based on the line drawing data.

Note that, in the present embodiment, a brightness value of the pixel to be processed is used for determining whether or not the pixel to be processed is in the ink line area, but the present exemplary non-limiting embodiments is not limited thereto. For example, values of R, G, and B of the pixel to be processed may be used for performing the above determination.

Also, in the present embodiment, a predetermined process is performed by referring to an area of 3×3 pixels surrounding the pixel to be processed at steps S34 and S35, but the present exemplary non-limiting embodiments is not limited thereto. For example, an area of 5×5 pixels may be referred to. Also at step S52, a neighboring area is not limited to an area of 5×5 pixels.

Furthermore, in the present embodiment, it is assumed that either white or black is written to each pixel of the line drawing storing buffer, but the present exemplary non-limiting embodiments is not limited thereto. For example, red, blue, or brown may be written to each pixel of the line drawing storing buffer.

While the exemplary non-limiting embodiments has been described in detail, the foregoing description is in all aspects illustrative and not restrictive. It is understood that numerous other modifications and variations can be devised without departing from the scope of the invention.

What is claimed is:

1. A line drawing image generating device for generating line drawing data of a plurality of pixels based on original image data of another plurality of pixels, comprising:
    ink line pixel detecting mechanism for detecting pixels each having a brightness smaller than a predetermined value in an original image, as ink line pixels;
    neighboring pixel detecting mechanism for detecting a neighboring pixels of the ink line pixels, which surround the ink line pixels;
    outline extraction process target limitation mechanism for performing an outline extraction process for entire pixels of the original image except the ink line pixels and the neighboring pixels thereof;
    outline pixel detecting mechanism for detecting outline pixels, by performing the outline extraction process for the entire pixels of the original image except the ink line pixels and the neighboring pixels thereof;
    line drawing data storing mechanism for storing the line drawing data; and
    color data writing mechanism for writing color data to a storage area of the line drawing data storing mechanism, which corresponds to the ink line pixels and the outline pixels, and writing different color data to another storage area of the line drawing data storing mechanism, which corresponds to pixels other than the ink line pixels and the outline pixels.

2. The line drawing image generating device according to claim 1, wherein
    the original image contains a plurality of pixels, and
    when the ink line pixels are included in predetermined pixels surrounding a pixel to be processed in the original image, and the pixel to be processed is not included in the ink line pixels, the neighboring pixel detecting mechanism detects the pixel to be processed as a neighboring pixel.

3. The line drawing image generating device according to claim 1, wherein the ink line pixel detecting mechanism detects, as the ink line pixels, a portion of pixels where brightness is smaller than a predetermined value, such that the portion of the pixels lies near an outline of the pixels.

4. The line drawing image generating device according to claim 3, wherein
    the original image contains a plurality of pixels, and
    when a pixel other than the ink line pixel is included in predetermined pixels surrounding a pixel to be processed included in pixels whose brightness is smaller than a predetermined value, the ink line pixel detecting mechanism detects the pixel to be processed as an ink line pixel.

5. The line drawing image generating device according to claim 1, further comprising still image data extracting mechanism for extracting arbitrary still image data from moving image data, wherein
    the line drawing data is generated using the still image data, which is extracted by the still image data extracting mechanism, as the original image data.

6. The line drawing image generating device according to claim 1, wherein the outline extraction process is performed using a Sobel operator.

7. The line drawing image generating device according to claim 1, further comprising preventing an ink line area formed by the ink line pixels from becoming thickened in a line drawing image by performing the outline extraction process for the entire pixels of the original image except the ink line pixels and the neighboring pixels thereof.

8. The line drawing image generating device according to claim 1, wherein the color data writing mechanism for writing color data to the storage data of the line drawing data storing mechanism, which corresponds to the ink line pixels and the outline pixels, re-writes data of ink line pixels which form an interior portion of an area formed by the ink line pixels to differ color data.

9. A computer readable storage medium storing a line drawing image generating program for generating line drawing data based on original image data, wherein the line drawing image generating program causes a computer to execute steps of:
    detecting pixels each of whose brightness is smaller than a predetermined value in an original image as ink line pixels;
    detecting neighboring pixels of the ink line pixels, which surround the ink line pixels;
    performing an outline extraction process for entire pixels of the original image except the ink line pixels and the neighboring pixels thereof;
    detecting outline pixels of an image as outline pixels by performing the outline extraction process for the entire pixels of the original image except the ink line pixels and the neighboring pixels thereof; and writing color data to a storage area of a line drawing data storing memory for storing the line drawing data, which corresponds to the ink line pixels and the outline pixels, and writing different color data to another storage area of the line drawing data storing memory, which corresponds to pixels other than the ink line pixels and the outline pixels.

10. The storage medium according to claim 9, wherein the original image contains a plurality of pixels, and when the ink line pixels are included in predetermined pixels surrounding a pixel to be processed in the original image and the pixel to be processed is not included in the ink line pixels, the line drawing image generating program causes the computer to detect the pixel to be processed as a neighboring pixel in the step of detecting the neighboring pixels.

11. The storage medium according to claim 9, wherein the step of detecting the ink line pixels, detects, as the ink line pixels, a portion of pixels where brightness is smaller than a predetermined value, such that the portion of pixels lies near an outline of the pixels.

12. The storage medium according to claim 11, wherein the original image contains a plurality of pixels, and when a pixel other than the ink line pixel is included in predetermined pixels surrounding a pixel to be processed included in pixels whose brightness is smaller than a predetermined value, the line drawing image generating program causes the computer to detect the pixel to be processed as an ink line pixel in the step of detecting the ink line pixels.

13. The storage medium according to claim 9 wherein the line drawing image generating program further causes the computer to execute a still image data extracting step of extracting arbitrary still image data from moving image data, and the line drawing image generating program causes the computer to generate the line drawing data using the still image data, which is extracted by the still image data extracting step, as the original image data.

14. The storage medium according to claim 9, wherein the outline extraction process is performed using a Sobel operator.

15. The storage medium according to claim 9, wherein the line drawing image generating program causes the computer to execute the further step of:

preventing an ink line area formed by the ink line pixels from becoming thickened in a line drawing image by performing the outline extraction process for the entire pixels of the original image except the ink line pixels and the neighboring pixels thereof.

16. The storage medium according to claim 9, further comprising re-writing color data to the storage area of the line drawing data storing memory for storing the line drawing data, which corresponds to the ink line pixels and the outline pixels, so that data corresponding to an interior portion of an area formed by the ink line pixels is rewritten to different color data.

17. A line drawing image generating method for generating line drawing data based on original image data, the method comprising:

detecting pixels each of whose brightness is smaller than a predetermined value in an original image, as ink line pixels;

detecting neighboring pixels of the ink line pixels, which surround the ink line pixels;

performing an outline extraction process for entire pixels of the original image except the ink line pixels and the neighboring pixels thereof;

detecting outline pixels of an image as outline pixels by performing the outline extraction process for the entire pixels of the original image except the ink line pixels and the neighboring pixels thereof; and writing color data to a storage area of a line drawing data storing memory for storing the line drawing data, which corresponds to the ink line pixels and the outline pixels, and writing different color data to another storage area of the line drawing data storing memory, which corresponds to pixels other than the ink line pixels and the outline pixels.

18. The method according to claim 17, wherein the outline extraction process is performed using a Sobel operator.

19. The method according to claim 17, further comprising preventing an ink line area formed by the ink line pixels from becoming thickened in a line drawing image by performing the outline extraction process for the entire pixels of the original image except the ink line pixels and the neighboring pixels thereof.

20. The method according to claim 17, further comprising re-writing color data to the storage area of the line drawing data storing memory for storing the line drawing data, which corresponds to the ink line pixels and the outline pixels, so that data corresponding to an interior portion of an area formed by the ink line pixels is rewritten to different color data.

21. A computer readable storage medium storing a line drawing image generating program for generating line drawing data based on an original image, wherein the line drawing image generating program causes a computer to execute:

detecting ink line pixels of the original image, the ink line pixels each having a brightness which is smaller than a predetermined value;

detecting neighboring pixels of the original image, the neighboring pixels neighboring the ink line pixels;

performing an outline extraction process for entire pixels of the original image except the ink line pixels and the neighboring pixels thereof;

detecting outline pixels of the original image, the outline pixels being outside of the ink line pixels and the neighboring pixels and having a brightness which differs from pixels adjacent to the outline pixels, by performing the outline extraction process for the entire pixels of the original image except the ink line pixels and the neighboring pixels thereof;

assigning data corresponding to a first color to both the ink line pixels and the outline pixels; and assigning data corresponding to a second color, different than the first color, to at least the neighboring pixels.

22. The storage medium of claim 21, wherein the program further causes the computer to re-assign data of an interior portion of an area formed by the ink line pixels so that the data of the interior portion of the area formed by the ink line pixels corresponds to another color different than the first color.

23. The storage medium of claim 21, wherein the program further causes the computer to obtain the original image by extracting a still image from a moving image.

24. The storage medium of claim 21, wherein in addition to the neighboring pixels, all other pixels of the original image outside of the ink line pixels and the outline pixels are assigned data corresponding to the second color.

25. The storage medium according to claim 21, wherein the outline extraction process is performed using a Sobel operator.

26. The storage medium according to claim 21, wherein the line drawing image generating program causes the computer to execute:

preventing an ink line area formed by the ink line pixels from becoming thickened in a line drawing image by performing the outline extraction process for the entire pixels of the original image except the ink line pixels and the neighboring pixels thereof.

27. A method of generating line drawing data based on original image data, the method comprising:

detecting pixels of an ink line area of the original image data, the ink line area pixels having respective brightnesses which are smaller than a predetermined value;

detecting pixels of a neighboring area of the original image data, the neighboring area pixels neighboring the ink line area pixels;

performing an outline extraction process for an entire area represented by the original image data except the ink line area and the neighboring area thereof;

detecting pixels of an outline area of the original image data, the outline area being outside of the ink line area and the neighboring area, by performing the outline extraction process for the entire area represented by the original image data except the ink line area and the neighboring area thereof, the outline area pixels each having a brightness which differ from that of pixels adjacent to the outline area pixels;

preventing the ink line area from becoming thickened in a line drawing image obtained from the outline extraction process by performing the outline extraction process for the entire area represented by the original image data except the ink line area and the neighboring area thereof;

assigning data corresponding to a first color to both the ink line area pixels and the outline area pixels; and assigning data corresponding to a second color, different than the first color, to at least the neighboring area pixels.

28. The method of claim 27, wherein the method further comprising re-assigning data of an interior portion of the ink line area so that the data assigned to the ink line area pixels of the interior portion of the ink line area corresponds to another color different from the first color.

29. The method of claim 27, wherein the method further comprises obtaining the original image data by extracting still image data from moving image data.

30. The method claim 27, wherein in addition to the neighboring area pixels, all other pixels of the original image data outside of the ink area and the outline area are assigned data corresponding to the second color.

31. The method according to claim 27, wherein the outline extraction process is performed using a Sobel operator.

* * * * *